United States Patent Office
3,014,843
Patented Dec. 26, 1961

3,014,843
METHOD OF PRODUCING NON-VIRULENT STRAINS OF ATTENUATED AND STABILIZED HOG CHOLERA VIRUS

James A. Baker, Ithaca, N.Y., assignor, by mesne assignments, to Armour & Company, Chicago, Ill., a corporation of Delaware No Drawing. Filed Feb. 7, 1955, Ser. No. 486,676
7 Claims. (Cl. 167—80)

This invention relates to a method of producing non-virulent strains of attenuated and stabilized hog cholera virus. More particularly, this invention relates to a method of establishing the non-virulence of an attenuated strain of hog cholera virus, whereby stable, non-virulent strains can be obtained for producing hog cholera vaccines.

Hog cholera vaccines have heretofore been produced from attenuated strains of hog cholera virus. In theory, such attenuated strains are produced by a procedure in which virulent hog cholera virus is modified from a diseased-producing virus to one incapable of causing disease. Since the virus is viable and still retains an antigenicity factor, when injected into a susceptible hog, it stimulates it to produce an active immunity against hog cholera. In practice, however, attenuated hog cholera vaccines have not proven as satisfactory as would be desirable.

While the administration of attenuated hog cholera virus to a non-immune hog seldom results in the death of the hog, there is frequently a rather serious post-vaccinal reaction approximating a mild case of hog cholera. This will be indicated by a febrile response, loss of appetite, failure to gain weight normally, etc. Thus, it can be seen that attenuated hog cholera virus as presently employed in hog cholera vaccines cannot always be accurately described as non-virulent. It appears in fact that many strains of hog cholera virus which are regarded as non-virulent may tend to revert to a state of marked virulence when inoculated into a non-immune hog.

It is therefore a general object of this invention to provide a method of producing and selecting non-virulent strains of attenuated hog cholera virus. More specifically, it is an object to provide a method of establishing the non-virulence of an attenuated strain of hog cholera virus, whereby truly non-virulent strains can be obtained for producing hog cholera vaccines. Further objects and advantages will become apparent as the specification proceeds.

This invention is based in part on the discovery that when a young, non-immune pig is inoculated with attenuated hog cholera virus, the virus does not become extinct after the period of high fever, but instead persists in the pig for many weeks, the persistent virus causing only a relatively mild febrile response. This is entirely unexpected since heretofore it has been assumed that the recovery of a hog from an inoculation with attenuated hog cholera virus is dependent on the production of sufficient antibodies to kill all of the virus organisms within not over 14 to 21 days. Moreover, it was thought that if the antibodies produced did not destroy the hog cholera virus, the virus infection would proceed unchecked and cause the death of the hog.

In one of its embodiments, the method of this invention is characterized by the steps of inoculating a non-immune pig of an age suitable for maintaining a persistent virus with an attenuated hog cholera virus, then feeding the pig an adequate ration for normal growth, and periodically measuring the temperature of the pig to determine its degree of rise above normal. When it is noted that the temperature of the hog has dropped from its maximum level above normal to an intermediate level above normal, viable hog cholera virus is harvested from the pig, providing, however, that the pig has approached a normal rate of weight gain.

The method of this invention is adapted for use with attenuated hog cholera virus produced by various known procedures. For example, a suitable attenuated hog cholera virus can be obtained by subjecting a rabbit-adapted strain of hog cholera virus to a plurality of serial passages through rabbits, as described in my article, "Serial Passage of Hog Cholera Virus in Rabbits," Proc. Exptl. Biol. Med., 63, 183–187 (1946). Usually about 13 to 15 rabbit transfers will be required to sufficiently attenuate the virulence of the virus to permit it to be used in producing hog cholera vaccines. Virulent hog cholera virus can be adapted to rabbits by alternation of hosts between rabbits and hogs. One specific procedure of accomplishing this result is disclosed in the patent of Cox and Koprowski, No. 2,519,978, issued August 15, 1950. Some strains may not require such adaptation, and these also are adapted for use in my invention. The method of adapting and attenuating the hog cholera virus does not form a part of the present invention, which as already indicated applies broadly to attenuated hog cholera virus however obtained or produced.

In practicing the method of this invention it is important to employ non-immune pigs of an age suitable for maintaining a persistent virus infection when inoculated with an attenuated hog cholera virus. Usually, it can be assumed that the offspring of a non-immune sow will likewise be non-immune, and therefore suitable for use in the method of this invention.

It is known that the colestrum or first milk has a very high gamma globulin content and would contain hog cholera antibodies if the sow was immune, thus resulting in a partial or complete immunization of the suckling pigs.

Apparently for this reason unweaned pigs rely primarily on the protection of the antibodies which they receive in the colestrum, and are not physiologically adapted at this early age for production of antibodies in the same way as mature hogs. I have discovered that during the period in which pigs normally rely primarily on the antibodies obtained in the colestrum, that the pigs are capable of accommodating and maintaining a persistent hog cholera virus infection when inoculated with attenuated hog cholera virus. Usually, this result can be obtained when the non-immune pig is less than three months old, although I prefer to employ pigs from about 5 to 10 weeks old at the time of inoculation.

The technique of inoculation is not critical, although particularly good results have been obtained with intramuscular injection of the attenuated virus. More generally, a parenteral injection of the attenuated virus is suitable.

In accordance with this invention, after the non-immune pig has been inoculated with the attenuated virus, the pig is fed an adequate ration for normal growth. This feeding will usually be more convenient when weaned pigs are employed, although the method can also be applied to suckling pigs. Pigs are ordinarily weaned at about the age of 5 to 6 weeks. All that is required then is that the weaned pigs be fed a sufficient amount of a standard commercial hog ration, which are mainly milk substitutes. I have also found it advantageous to incorporate in the ration a minor proportion of oxytetracycline.

In addition to maintaining the pig on a normal diet after the inoculation, its temperature should be periodically measured to determine its degree of rise above normal, since this will indicate the progress of the virus infection. As is well known in the art, within about 3 to 5 days or longer after the inoculation, a marked febrile response will be noted, the temperature of the animal usually rising from a normal of around 102° F. to a maximum of about 106° F. The temperature of the animal will remain at this high level for 3 to 5 days or longer and then return to normal if the inoculated animal is not of the specific character defined herein, that is, a non-immune pig of an age suitable for maintaining a persistent virus infection. On the other hand, when the animal is of a type suitable for practicing the method of this invention, the temperature will not immediately return to normal at the end of the high temperature period, but instead will fall to an intermediate level where it will remain for a number of days. It is with this intermediate temperature period that this invention is particularly concerned, since it is during this period that the pig can be said to have a persistent virus infection, as distinguished from an acute virus infection.

While there is some variation from animal to animal, the drop in temperature to the intermediate level described above will usually occur within about 8 to 10 days after the onset of the fever and will continue for up to 6 weeks in some cases. The exact duration of the intermediate febrile response can of course be readily determined by taking the temperature of the animal. Unusually, a temperature of from 1 to 2° above normal, that is, a temperature of about 103 to 104° F. will be observed during the intermediate temperature period. The surprising thing is that the virus infection can persist without killing the animal, since no cases have heretofore been reported where an animal maintained a febrile response to inoculation with attenuated hog cholera virus beyond 3 weeks, and it has usually been agreed that if the infection were not completely overcome within 3 weeks the animal would be dead.

As a further step in the method of this invention, viable hog cholera virus is harvested from the pig during the period of the persistent virus infection, that is, when the temperature of the hog has dropped from its maximum level above normal to an intermediate level above normal. The particular method of harvesting the virus is not critical, although it is preferred to harvest the virus without killing the animal. This can be done by removing a non-injurious quantity of blood from the animal at spaced intervals during the period of the persistent virus infection. Usually the best blood samples will be obtained during the 4th and 5th week after inoculation, although samples taken during the 3rd and 6th weeks may also be of value. Alternatively, the animals can be sacrificed and the hog cholera virus obtained from all of the blood, or from other tissues containing the virus, such as the spleen, etc.

In practicing this invention, the rate of weight gain of the inoculated pigs is observed by weighing the pigs at spaced intervals and comparing the weight changes with those which would be normally expected for pigs of the age and breed of those being employed. For example, pigs from 5 to 10 weeks of age can usually be expected to gain about 4 to 5 pounds per week when fed with an adequate ration for normal growth. If the pig does not approach a normal rate of weight gain, especially during the period of the persistent virus infection, this is an indication that the strain of virus with which the pig has been inoculated has a tendency to revert to a state of greater virulence, and therefore should be rejected for purposes of producing a hog cholera vaccine. On the other hand, if the pig evidences a normal rate of weight gain, this is a direct indication that the strain of virus persisting within the animal has substantially no tendency to become virulent, and thereby can more accurately be described as a non-virulent strain of hog cholera virus. Therefore, the hog cholera virus will not be harvested for the purpose of producing a hog cholera vaccine in accordance with this invention unless the pig has approached a normal rate of weight gain.

If desired, the degree of virulence of the hog cholera virus obtained as described above can be further tested by injecting it in a non-immune mature hog, and noting the relative severity of the symptoms of hog cholera which result. This further testing procedure definitely shows that the method of this invention is of value in establishing the stability and non-virulence of an attenuated strain of hog cholera virus.

The stable non-virulent nature of hog cholera virus obtained as described above can then be used to produce a vaccine in accordance with various known procedures, such as propagation in rabbits or in hogs. More specifically, the hog propagation technique described in Killinger and Dick Patent No. 2,594,180, issued April 22, 1952, can be employed.

The method of this invention will be further illustrated by the following specific examples.

EXAMPLE

Attenuated, 15-serial passage hog cholera virus was prepared as described in "Serial Passage of Hog Cholera Virus in Rabbits," by James A. Baker, Proceedings of the Society for Experimental Biology and Medicine, 1946, v. 63, 183–187. The various strains of 15-serial passage virus were inoculated into rabbits, as a preliminary step to the following procedure for establishing the non-virulence and stability of the various strains.

Spleen from each rabbit receiving 15th passage virus was weighed, made into a 10% suspension and each pig inoculated intramuscularly in the right thigh with 1 ml. Thereafter temperatures were taken daily and weights recorded each week. Prior to inoculation, and at weekly intervals thereafter, 5 ml. of blood was removed from the anterior vena cava of each pig, defibrinated in an Erlenmeyer flank with glass beads. From each defibrinated specimen 1 ml. each was distributed into several glass vials and these were then stored under dry ice refrigeration.

The pigs employed in the above test were non-immune, being the offspring of non-immune sows, and were all weaned, ranging in ages from 6 to 8 weeks at the time of inoculation. The pigs were fed an adequate ration for normal growth, including terramycin as a minor part of the ration. A study of the temperature and weight measurement showed that the pigs which approached a normal rate of weight gain of about 4 to 5 pounds per week within four weeks after inoculation had acquired a persistent virus infection, as evidenced by intermediate level temperatures with respect to the highest temperature reached after inoculation, and the normal temperature of the animal. While there was some variation from animal to animal in the temperatures recorded, two series of temperature measurements on different animals may be taken as illustrative. The first pig reached a temperature high of 104.8° F. nine days after inoculation. Blood samples were removed from this pig at 14, 21 and 28 days, temperatures of 102.0, 103.2 and 103.8 respectively being recorded on these days. Another pig after reaching the temperature high of 107° F. on the eighth day after inoculation, showed temperatures of 105.2 on the fourteenth day, 104.2 on the 21st day, and 104.0 on the 28th day.

The fact that many of the animals were able to achieve a normal rate of weight gain in spite of the persistent virus infection, strongly indicated that the virus was not only attenuated, but in addition had been stabilized, and had no tendency to revert to a state of greater virulence. This conclusion was confirmed by another test procedure in which the various blood samples were compared in the following manner.

In confirming stability and attenuation of virus, a blood specimen from a pig was selected, thawed, a 10% suspension made, and a rabbit inoculated intravenously with 1 ml. After a period of 5 days, the rabbit was killed, its spleen removed, weighed, a 10% suspension made and a pig susceptible to hog cholera inoculated as described above. In addition, rabbits were inoculated as described above in order to determine ability to maintain virus in rabbits. Stability of virus for vaccine purposes was determined by thermal reaction in the inoculated pig and subsequent development of immunity to an inoculation of virulent virus that killed controlled pigs.

The above test bore out the conclusion previously reached, and also provided a further means for selecting the most attenuated, least virulent, and most stable strains of the hog cholera virus. The finally selected strains were then used to prepare vaccine, according to the following procedure.

In making vaccine, rabbits were inoculated as described. Five days after inoculation, rabbits were killed and liver, spleen, kidneys, lungs and blood removed. These various materials were pooled and a 10% suspension made in sucrose-glutimate-albumin buffer solution (formula below) with a Waring Blendor. The suspension was distributed in 2 ml. amounts in vials, shell frozen and dried from the frozen state. The dried material represents vaccine and for administration to swine is reconstituted with 2 ml. sterile distilled water and injected intramuscularly.

*Sucrose-albumin-glutamate formula*

| | |
|---|---|
| Sucrose, C.P. | gm __ 74.621 |
| Monopotassium phosphate | gm __ 0.517 |
| Dipotassium phosphate | gm __ 1.254 |
| Monopotassium 1-glutamate monohydrate | gm __ 0.956 |
| Bovine albumin | gm __ 10.0 |
| Distilled water q.s. | ml __ 1000 |

Seitz filter and then refrigerate at 4–6° C.

While in the foregoing specification the method of this invention has been described primarily in relation to a specific embodiment thereof and many details have been set forth for purpose of illustration, it will be apparent to those skilled in the art that the method of this invention is susceptible to other embodiments and that many of the details set forth herein can be varied widely without departing from the basic concepts of the invention.

I claim:

1. The method of establishing the non-virulence of an attenuated strain of hog cholera virus, whereby relatively non-virulent strains can be obtained for producing hog cholera vaccines, characterized by the steps of inoculating a non-immune pig suitable for maintaining a persistent virus infection with a hog cholera attenuated virus, said non-immune pig being less than three months of age, feeding said pig an adequate ration for normal growth, measuring the temperature of said pig to determine the degree of temperature rise above normal, and harvesting viable hog chlorea virus from said pig when the temperature of said pig has dropped from its maximum level above normal to an intermediate level above normal, said intermediate level being at least 1° F. below said maximum level and at least 1° F. above the normal level for said pig, providing said pig has approached a normal rate of weight gain and continues to have a temperature at said intermediate level during the third week after said inoculation.

2. The method of claim 1 in which said non-immune pig at the time of said inoculation is from about 5 to 10 weeks old.

3. The method of establishing the non-virulence of an attenuated strain of hog cholera virus, whereby relatively non-virulent strains can be obtained for producing hog cholera vaccines, characterized by the steps of inoculating a non-immune pig of less than 3 months of age with a hog cholera attenuated virus, feeding said pig an adequate ration for normal growth, measuring the temperature of said pig to determine the degree of temperature rise above normal, and harvesting viable hog cholera virus from said pig when the temperature of said pig has dropped from its maximum level above normal to an intermediate level above normal, said intermediate level being at least 1° F. below said maximum level and at least 1° F. above the normal level for said pig, providing said pig has approached a normal rate of weight gain and continues to have a temperature at said intermediate level during the third week after said inoculation, at least part of said harvesting being carried out more than 3 weeks after said inoculation.

4. The method of claim 3 in which said non-immune pig at the time of said inoculation is from 5 to 10 weeks old.

5. The method of establishing the non-virulence of an attenuated strain of hog cholera virus, whereby relatively non-virulent strains can be obtained for producing hog cholera vaccines, characterized by the steps of inoculating a non-immune pig of less than 3 months of age with an attenuated hog cholera virus, feeding said pig an adequate ration for normal growth including a minor proportion of oxytetracycline measuring the temperature of said pig to determine the degree of temperature rise above normal, and harvesting viable hog cholera virus from said pig when the temperature of said pig has dropped from a maximum of approximately 106° F. to an intermediate level above normal of substantially 103 to 104° F., providing said pig has approached a normal rate of weight gain and continues to have a temperature at said intermediate level during the third week after said inoculation, at least part of said harvesting being carried out more than 3 weeks after said inoculation.

6. The method of claim 5 in which said harvesting is carried out at least in part by removing a non-injurious quantity of blood during at least the 4th and 5th weeks after said inoculation.

7. The method of establishing the non-virulence of an attenuated strain of hog cholera virus, whereby relatively non-virulent strains can be obtained for producing hog cholera vaccines, characterized by the steps of inoculating a non-immune pig from about 5 to 10 weeks of age with an attenuated hog cholera virus, feeding said pig an adequate ration for normal growth, measuring the temperature of said pig to determine the degree of temperature rise above normal, and harvesting viable hog cholera virus from said pig when the temperature of said pig has dropped from its maximum level above normal to an intermediate level above normal, said intermediate level being at least 1° F. below said maximum level and at least 1° F. above the normal level for said pig, providing said pig has approached a rate of weight gain of about 4 to 5 pounds per week and continues to have a temperature at said intermediate level during the third week after said inoculation.

References Cited in the file of this patent

UNITED STATES PATENTS 2,594,180     Killinger _____ Apr. 22, 1952

OTHER REFERENCES

Baker et al.: Proc. Soc. Exptl. Biol. and Med., October 1946, pages 183–187.

Koprowski et al.: Proc. Soc. Exptl. Biol. and Med., October 1946, vol. 63, pages 178–183.

Boyd: "Fundamentals of Immunology," pages 375–376, pub. 1947 by Interscience Pub. Co.